United States Patent
Hur et al.

(10) Patent No.: US 8,331,079 B2
(45) Date of Patent: Dec. 11, 2012

(54) MULTILAYER CERAMIC CAPACITOR AND METHOD OF MANUFACTURING THE SAME

(75) Inventors: Kang Heon Hur, Gyunggi-do (KR); Doo Young Kim, Gyunggi-do (KR); Mun Su Ha, Gyunggi-do (KR); Chul Seung Lee, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 253 days.

(21) Appl. No.: 12/941,589

(22) Filed: Nov. 8, 2010

(65) Prior Publication Data
US 2011/0157768 A1 Jun. 30, 2011

(30) Foreign Application Priority Data
Dec. 30, 2009 (KR) .................. 10-2009-0134458

(51) Int. Cl.
*H01G 4/06* (2006.01)
(52) U.S. Cl. .................. 361/321.2; 361/321.1; 361/303; 361/311; 361/313; 361/306.1
(58) Field of Classification Search ............... 361/321.1, 361/321.2, 321.4, 303–305, 311–313, 306.1, 361/306.3, 308.1, 301.1, 301.4
See application file for complete search history.

(56) References Cited

U.S. PATENT DOCUMENTS

| | | | |
|---|---|---|---|
| 5,142,437 A * | 8/1992 | Kammerdiner et al. ... | 361/321.1 |
| 6,381,118 B1 * | 4/2002 | Yokoyama et al. ........ | 361/308.1 |
| 6,587,327 B1 * | 7/2003 | Devoe et al. ............... | 361/306.3 |
| 6,639,267 B2 * | 10/2003 | Eldridge ....................... | 257/310 |
| 7,123,467 B2 * | 10/2006 | Greier et al. ............... | 361/321.2 |
| 8,194,390 B2 * | 6/2012 | Kim et al. .................. | 361/321.2 |
| 2010/0157505 A1 * | 6/2010 | Feichtinger et al. ....... | 361/301.4 |

FOREIGN PATENT DOCUMENTS

| | | |
|---|---|---|
| JP | 11-003834 | 1/1999 |
| JP | 11-162777 A | 6/1999 |
| JP | 2000-340450 A | 12/2000 |
| JP | 2002-270458 A | 9/2002 |

(Continued)

OTHER PUBLICATIONS

Korean Office Action, w/ English translation thereof, issued in Korean Patent Application No. KR 10-2009-0134458 dated Apr. 21, 2011.

(Continued)

*Primary Examiner* — Nguyen T Ha
(74) *Attorney, Agent, or Firm* — McDermott Will & Emery LLP

(57) ABSTRACT

A multilayer ceramic capacitor and a method of manufacturing the same are provided. The multilayer ceramic capacitor includes a capacitive part, a passivation layer, and first and second outer electrodes. In the capacitive part, a plurality of dielectric layers and a plurality of first and second inner electrodes are alternately laminated, and ends of the first and second inner electrodes are alternately and respectively exposed in a direction of lamination of the dielectric layers. The passivation layer is provided at either or both of the top and bottom surfaces of the capacitive part. The first and second outer electrodes are electrically connected to the first and second inner electrodes exposed in a direction of lamination of the dielectric layers. One or more inner electrodes disposed at both ends in a direction of lamination among the plurality of inner electrodes include oxide represented by Ni—Mg—O.

9 Claims, 2 Drawing Sheets

FOREIGN PATENT DOCUMENTS

| | | |
|---|---|---|
| JP | 2009-182011 A | 8/2009 |
| JP | 2009-224569 A | 10/2009 |
| KR | 10-2007-0014052 A | 1/2007 |
| KR | 10-2008-0032883 A | 4/2008 |
| KR | 10-2009-0102120 A | 9/2009 |

OTHER PUBLICATIONS

Office Action with English translation issued in corresponding JP Patent Application No. 2010-249020 dated May 25, 2012.

* cited by examiner

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2009-0134458 filed on Dec. 30, 2009, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same, and more particularly, to a multilayer ceramic capacitor having high reliability because of its low crack occurrence rate and low blister occurrence rate, and a method of manufacturing the same.

2. Description of the Related Art

In general, a ceramic electronic component using a ceramic material, for example, a capacitor, an inductor, a piezoelectric device, a varistor, or a thermistor, includes a ceramic body, an inner electrode provided inside the ceramic body, and an outer electrode provided on the ceramic body to contact the inner electrode.

As one of various ceramic electronic components, a multilayer ceramic capacitor includes a plurality of laminated dielectric layers, inner electrodes interleaved with the dielectric layers, and outer electrodes electrically connected to the inner electrodes.

Multilayer ceramic capacitors are being widely used in mobile communications devices, such as laptop computers, PDAs mobile phones and the like, due to their small size, high capacity and ease of mounting.

Recently, as electronic products have become compact and multi-functional, chip components have also tended to become compact and multi-functional. Following this trend, a multilayer ceramic capacitor is required to be smaller than ever before while having a high capacity.

As for a general method of manufacturing a multilayer ceramic capacitor, ceramic green sheets are manufactured and a conductive paste is printed on the ceramic green sheets to thereby form inner electrode layers. Tens to hundreds of such ceramic green sheets, provided with the inner electrode layers, are then laminated to thereby produce a green ceramic laminate. Thereafter, the green ceramic laminate is pressed at a high pressure and at a high temperature and subsequently cut into green chips. Thereafter, the green chip is subjected to plasticizing, sintering and polishing processes, and outer electrodes are then formed thereupon, thereby completing a multilayer ceramic capacitor.

As the multilayer ceramic capacitor has recently become smaller in size and higher in capacitance, many attempts have been made to manufacture a slim and multilayer ceramic body. However, as the ceramic body has become slim and multilayered, defects such as cracks and blisters are generated, causing the degradation in the reliability of a multilayer ceramic capacitor.

SUMMARY OF THE INVENTION

An aspect of the present invention provides a multilayer ceramic capacitor having high reliability because of its low crack occurrence rate and low blister occurrence rate, and a method of manufacturing the same.

According to an aspect of the present invention, there is provided a multilayer ceramic capacitor including: a capacitive part in which a plurality of dielectric layers and a plurality of first and second inner electrodes are alternately laminated, ends of the first and second inner electrodes being alternately and respectively exposed in a direction of lamination of the dielectric layers; a passivation layer provided at either or both of the top and bottom surfaces of the capacitive part; and first and second outer electrodes electrically connected to the first and second inner electrodes exposed in a direction of lamination of the dielectric layers, wherein one or more inner electrodes disposed at both ends in a direction of lamination among the plurality of inner electrodes include oxide represented by Ni—Mg—O.

The outermost inner electrode disposed at both ends in the direction of lamination may include 30% or more of oxide represented by Ni—Mg—O.

A ratio of the oxide represented by Ni—Mg—O may be gradually reduced from the both ends in the direction of lamination toward the inside of the capacitive part.

The passivation layer may include 0.5-10 wt % of Mg.

The passivation layer may include glass containing 0.5-15 wt % of Si.

According to another aspect of the present invention, there is provided a method of manufacturing a multilayer ceramic capacitor, including: preparing a capacitive part in which a plurality of dielectric layers and a plurality of first and second inner electrodes are alternately laminated, ends of the first and second inner electrodes being alternately and respectively exposed in a direction of lamination of the dielectric layers; forming a passivation layer at either or both of the top and bottom surfaces of the capacitive part; performing a firing process under an oxygen partial pressure at which one or more inner electrodes disposed at both ends in a direction of lamination among the plurality of inner electrodes are oxidized; and forming first and second outer electrodes electrically connected to the first and second inner electrodes which are exposed in a direction of lamination of the dielectric layers.

The passivation layer may include 0.5-10 wt % of Mg.

The passivation layer may include glass containing 0.5-15 wt % of Si.

The firing process may be performed under Ni—NiO equilibrium oxygen partial pressure (PPO2) of 10-9 atm or more.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
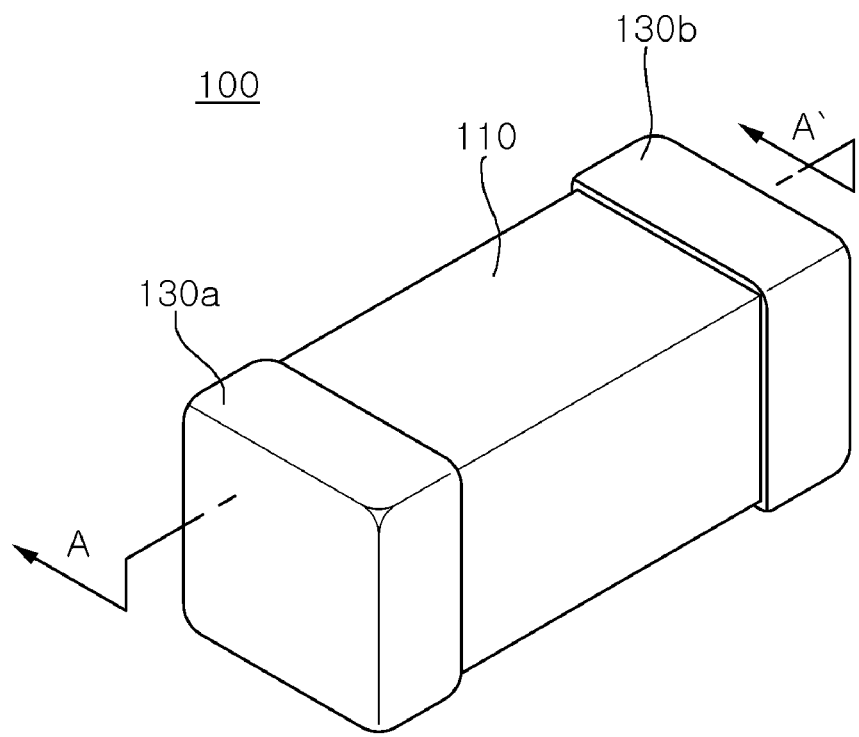
FIG. 1 is a schematic perspective view of a multilayer ceramic capacitor according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 2:
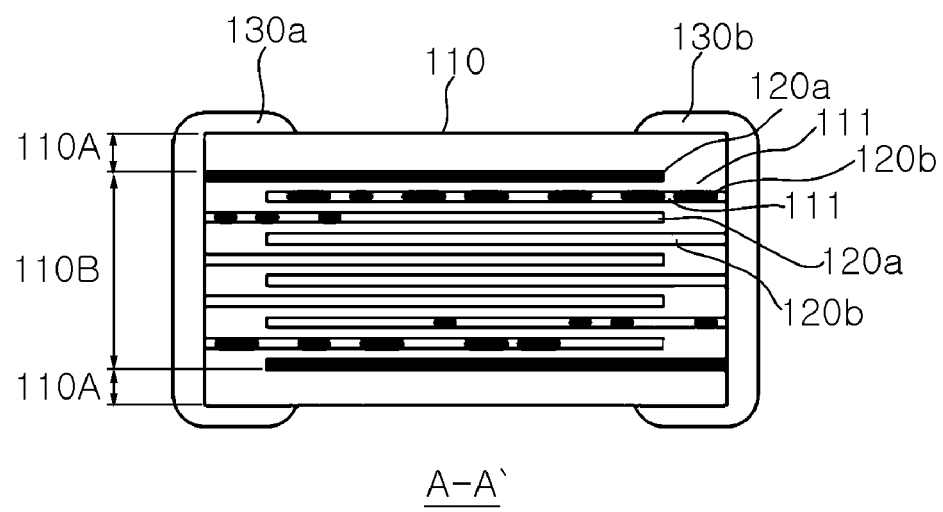
FIG. 2 is a schematic cross-sectional view taken along line A-A' of FIG. 1.

FIG. 1 is a schematic perspective view of a multilayer ceramic capacitor according to an embodiment of the present invention, and FIG. 2 is a schematic cross-sectional view taken along line A-A' of FIG. 1.

Referring to FIGS. 1 and 2, a multilayer ceramic capacitor 100 according to an embodiment of the present invention includes a ceramic body 110, first and second inner electrodes 120a and 120b provided inside the ceramic body 110, and first and second outer electrodes 130a and 130b electrically connected to the first and second inner electrodes 120a and 120b.

The ceramic body 110 includes a capacitive part 110B and passivation layers 110A provided on the top and bottom surfaces of the capacitive part 110B.

The capacitive part 110B has a structure in which a plurality of dielectric layers 111 and a plurality of first and second inner electrodes 120a and 120b are alternately laminated. The first and second inner electrodes 120a and 120b are a pair of electrodes having different polarities. The first and second inner electrodes 120a and 120b are disposed to face each other along a direction of lamination of the dielectric layers 111, and are electrically insulated from each other by the dielectric layers 111. Ends of the first and second inner electrodes 120a and 120b are alternately and respectively exposed in a direction of lamination of the dielectric layers 111. The exposed ends of the first and second inner electrodes 120a and 120b are electrically connected to the first and second outer electrodes 130a and 130b, respectively.

When a predetermined voltage is applied to the first and second outer electrodes 130a and 130b, electric charges are accumulated between the first and second inner electrodes 120a and 120b which face each other. The static capacitance of the multilayer ceramic capacitor increases in proportion to the areas of the first and second inner electrodes 120a and 120b which face each other.

The dielectric layer 111 of the capacitive part 110B may be formed of a ceramic material having high permittivity. For example, the dielectric layers 111 may be formed of, but are not limited to, a barium titanate ($BaTiO_3$)-based ceramic, a lead complex perovskite-based ceramic, or a strontium titanate ($SrTiO_3$)-based ceramic.

The passivation layers 110A may be formed on either or both of the top and bottom surfaces of the capacitive part 110B. In this embodiment, the passivation layers 110A are formed on both of the top and bottom surfaces of the capacitive part 110B.

The passivation layers 110A may be formed of a ceramic material having high permittivity. For example, the passivation layers 110A may be formed of, but are not limited to, a barium titanate ($BaTiO_3$)-based ceramic, a lead complex perovskite-based ceramic, or a strontium titanate ($SrTiO_3$)-based ceramic. In addition, the passivation layer 110A includes 0.5-10 wt % of Mg. In this embodiment, Mg may be added in a manner known to those skilled in the art, without particular limitations. For example, Mg may be added in a form of $MgCO_3$ or MgO. Mg existing in the passivation layer 110A moves to the inner electrode during firing to thereby form oxide represented by Ni—Mg—O. The oxide represented by Ni—Mg—O is more stable than oxide represented by Ni—O. When a large amount of Ni—Mg—O exists in the inner electrode, the adhesiveness between the passivation layer and the inner electrode is improved.

When a content of Mg existing in the passivation layer is less than 0.5 wt %, the adhesiveness between the passivation layer and the inner electrode may be weakened. When a content of Mg existing in the passivation is more than 10 wt %, Mg may degrade the dielectric characteristic of the capacitive part.

In addition, the passivation layer may include glass. The glass includes Si, and may include an alkaline metal or an alkaline earth metal together with Si. In the glass included in the passivation layer, a content of Si may be in the range of 0.5-15 wt %. When the content of Si is less than 0.5 wt %, the adhesiveness between the passivation layer and the inner electrode may be weakened. When the content of Si is more than 15 wt %, the Si content of the passivation layer may degrade the dielectric characteristic of the capacitive part.

The passivation 110A may be formed to be thicker than the dielectric layer 111 of the capacitive part 110B. For example, the dielectric layer 111 of the capacitive part 110B may be 2 μm or less and laminated with approximately 25 layers or more, and thus, the thickness of the capacitive part 110B may be in the range of 50-2,000 μm. In this case, the thickness of the passivation layer 110A may be in the range of 10-100 μm.

The first and second inner electrodes 120a and 120b are formed of a conductive metal, for example, Ni or a Ni alloy. The Ni alloy may include Mn, Cr, Co or Al together with Ni.

One or more inner electrodes disposed at both ends of the ceramic body in a direction of lamination include oxide represented by Ni—Mg—O. The both ends in the direction of lamination refer to regions contacting the passivation layers 110A in the capacitive part 110B.

Only the outermost inner electrode among the plurality of inner electrodes may an oxidized inner electrode including an oxide represented by Ni—Mg—O.

Alternatively, one or more inner electrodes disposed inside the capacitive part, not the outermost position of the capacitive part, may include the oxide represented by Ni—Mg—O. In this case, the oxidation rate of the outermost inner electrode is highest, and the oxidation rate of the inner electrodes is gradually reduced toward the inside of the capacitive part. The inner electrode disposed at the outermost ends in the direction of lamination may include 30% or more of the oxide represented by Ni—Mg—O.

The number of the oxidized inner electrodes and the oxidation rate of the inner electrodes may be determined by adjusting a level of oxygen partial pressure during firing.

The oxidized inner electrode has excellent adhesiveness with the passivation layer, thereby improving the adhesiveness between the capacitive part and the passivation layer. Accordingly, crack and blister occurrence rates between the capacitive part and the passivation part are reduced.

Furthermore, the oxidized inner electrode prevents the penetration of moisture from the outside, thereby improving the humidity resistance of the multilayer ceramic capacitor.

The first and second outer electrodes 130a and 130b are formed of, but are not limited to, a conductive metal. For example, the first and second outer electrodes 130a and 130b may include copper.

Hereinafter, a method of manufacturing a multilayer ceramic capacitor according to an embodiment of the present invention will be described.

First, a plurality of ceramic green sheets to be laminated in a capacitive part are prepared. Specifically, a slurry is formed by mixing a ceramic powder, a binder, and a solvent, and the slurry is made into a sheet having a thickness of several μm by a doctor blade method.

Then, a paste for an inner electrode is coated on the ceramic green sheets to form first and second inner electrode patterns. The first and second inner electrode patterns may be formed by a screen printing process. The paste for an inner electrode may be formed by dispersing a Ni or Ni alloy powder into an organic binder and an organic solvent. The Ni alloy may include Mn, Cr, Co, or Al together with Ni.

The organic binder may use a binder known in the art to which the invention pertains. For example, the organic binder may use, but is not limited to, a cellulose-based resin, an epoxy resin, an aryl resin, an acryl resin, a phenol-formaldehyde resin, an unsaturated polyester resin, a polycarbonate resin, a polyamide resin, a polyimide resin, an alkyd resin, or a rosin ester.

Furthermore, the organic solvent may also use an organic solvent known in the art to which the invention pertains. For example, the organic solvent may use, but is not limited to, butyl carbitol, butyl carbitol acetate, turpentine oil, α-terebineol, ethyl cellosolve, or butyl phthalate.

Next, the ceramic green sheets in which the first and second inner electrode patterns are formed are laminated and pressed in a direction of lamination to thereby attach the laminated ceramic green sheets to the paste for an inner electrode. In this way, a capacitive part in which the ceramic green sheets and the paste for an inner electrode are alternately laminated is manufactured.

Next, a plurality of ceramic green sheets to be laminated on the top and bottom surfaces of the capacitive part are prepared. Specifically, a slurry is formed by mixing a ceramic powder, Mg, an organic binder, and a solvent, and the slurry is made into a sheet having a thickness of several μm by a doctor blade method. The content of Mg is in the range of 0.5-10 wt % with respect to the entire composition. A Si-containing glass may be added. In this case, the content of Si may be in the range of 0.5-15 wt % with respect to the entire composition.

The ceramic green sheets are laminated in the capacitive part to thereby obtain a multilayer ceramic body in which a passivation layer is formed.

Next, the multilayer ceramic body is cut to form a chip in each region corresponding to a single capacitor. In this case, the multilayer ceramic body is cut such that ends of the first and second inner electrode patterns are alternately and respectively exposed to the ends thereof.

Then, a ceramic sintered body is manufactured by firing the chips under a condition that oxidizes one or more inner electrodes disposed at both ends of the multilayer ceramic body in the direction of lamination. The firing condition employs a firing atmosphere which has a higher oxygen partial pressure than a typical oxygen partial pressure ($PPO_2 < 10^{-9}$ atm), specifically, it has a Ni—NiO equilibrium oxygen partial pressure ($PPO_2 = 10^{-9}$ atm or more). The firing temperature may be 1,200° C. The number of the oxidized inner electrodes and the oxidation rate of the inner electrodes may be adjusted according to the oxygen partial pressure.

Afterwards, first and second outer electrodes are formed to cover the ends of the ceramic sintered body and to be electrically connected to the first and second inner electrodes which are exposed to the ends of the ceramic sintered body.

Next, the surfaces of the outer electrodes may be plated with Ni or Sn.

Figure 3:
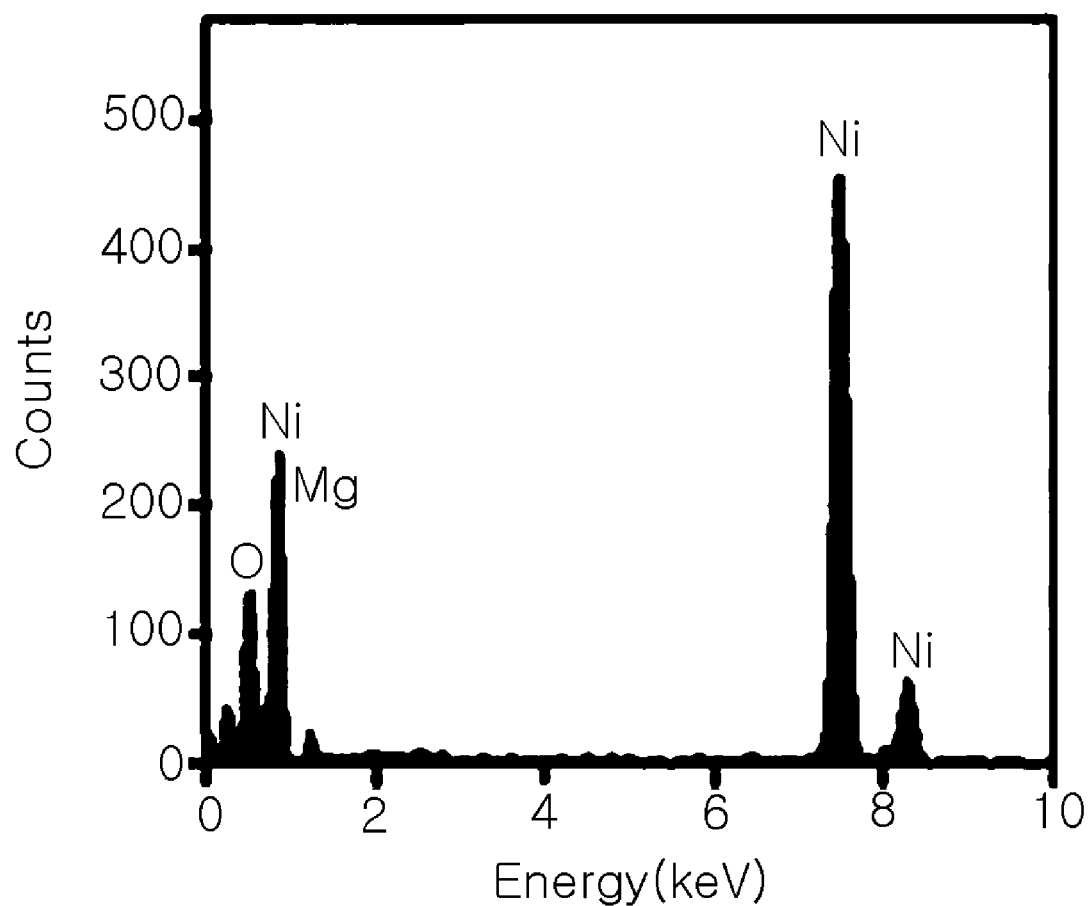
FIG. 3 shows analysis result of the multilayer ceramic capacitor in an energy dispersive spectrometer (EDS) of a transmission electron microscope (TEM).

The multilayer ceramic capacitor manufactured according to the embodiment of the present invention was cut in a direction of lamination, and the cut surface was polished. Components in the cut surface were analyzed using an energy dispersive spectrometer (EDS) of a transmission electron microscope (TEM). The analysis results are illustrated in FIG. 3. It can be seen from FIG. 3 that the oxide represented by Ni—Mg—O exists.

In addition, as shown in Table 1 below, multilayer ceramic capacitors were manufactured while changing the composition of the passivation layer, and the blister occurrence rate and the crack occurrence rate of the manufactured multilayer ceramic capacitors were measured.

TABLE 1

|  | Mg (wt %) | Si (wt %) | Blister occurrence rate (%) | Cover crack occurrence rate (%) |
| --- | --- | --- | --- | --- |
| Comparative Example 1 | 0.1 | 1.5 | 25 | 23 |
| Embodiment 1 | 1.0 | 1.5 | 16 | 8.8 |
| Embodiment 2 | 3.0 | 1.5 | 17 | 4.9 |
| Embodiment 3 | 5.0 | 1.5 | 8.0 | 5.0 |
| Comparative example 2 | 1.0 | 0.1 | 30 | 45 |
| Embodiment 4 | 1.0 | 3.0 | 8.1 | 4.8 |
| Embodiment 5 | 1.0 | 10 | 6.0 | 7.2 |

As set forth above, according to exemplary embodiments of the invention, the multilayer ceramic capacitor includes the oxidized inner electrode in the capacitive part adjacent to the passivation layer. The oxidized inner electrode includes oxide represented by Ni—Mg—O, which has excellent adhesiveness with the passivation layer. Therefore, the adhesiveness between the capacitive part and the passivation layer is improved, thereby reducing the crack occurrence rate and the blister occurrence rate between the capacitive part and the passivation layer.

Moreover, the oxidized inner electrode prevents the penetration of moisture from the outside, thereby improving the humidity resistance of the multilayer ceramic capacitor.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
  a capacitive part in which a plurality of dielectric layers and a plurality of first and second inner electrodes are alternately laminated, ends of the first and second inner electrodes being alternately and respectively exposed in a direction of lamination of the dielectric layers;
  a passivation layer provided at either or both of the top and bottom surfaces of the capacitive part; and
  first and second outer electrodes electrically connected to the first and second inner electrodes exposed in a direction of lamination of the dielectric layers,
  wherein one or more inner electrodes disposed at both ends in a direction of lamination among the plurality of inner electrodes comprise oxide represented by Ni—Mg—O.

2. The multilayer ceramic capacitor of claim 1, wherein the outermost inner electrode disposed at both ends in the direction of lamination comprises 30% or more of oxide represented by Ni—Mg—O.

3. The multilayer ceramic capacitor of claim 1, wherein a ratio of the oxide represented by Ni—Mg—O is gradually reduced from the both ends in the direction of lamination toward the inside of the capacitive part.

4. The multilayer ceramic capacitor of claim 1, wherein the passivation layer comprises 0.5-10 wt % of Mg.

5. The multilayer ceramic capacitor of claim 1, wherein the passivation layer comprises glass containing 0.5-15 wt % of Si.

6. A method of manufacturing a multilayer ceramic capacitor, the method comprising:
preparing a capacitive part in which a plurality of dielectric layers and a plurality of first and second inner electrodes are alternately laminated, ends of the first and second inner electrodes being alternately and respectively exposed in a direction of lamination of the dielectric layers;
forming a passivation layer at either or both of the top and bottom surfaces of the capacitive part;
performing a firing process under an oxygen partial pressure at which one or more inner electrodes disposed at both ends in a direction of lamination among the plurality of inner electrodes are oxidized; and
forming first and second outer electrodes electrically connected to the first and second inner electrodes which are exposed in a direction of lamination of the dielectric layers.

7. The method of claim 6, wherein the passivation layer comprises 0.5-10 wt % of Mg.

8. The method of claim 6, wherein the passivation layer comprises glass containing 0.5-15 wt % of Si.

9. The method of claim 6, wherein the firing process is performed under Ni—NiO equilibrium oxygen partial pressure ($PPO_2$) of $10^{-9}$ atm or more.

* * * * *